2,955,021
Patented Oct. 4, 1960

2,955,021

CYANOGEN PRODUCTION

Lloyd S. Eubanks, Texas City, Tex., assignor to Monsanto Chemical Company, St. Louis, Mo., a corporation of Delaware No Drawing. Filed Dec. 22, 1958, Ser. No. 781,912

2 Claims. (Cl. 23—151)

The invention relates to the preparation of cyanogen and, more particularly, to the production of cyanogen by the vapor phase oxidation of hydrogen cyanide.

Cyanogen has recently come to be recognized as an important chemical of commerce in view of its utility as a fumigant, a gas for welding, a nitrogen additive in steel making, and as an intermediate in chemical synthesis, for example, in the preparation of various nitriles and in the preparation of oxamide by acid hydrolysis.

In the past, cyanogen has been prepared by a number of various methods. However, these methods have not lent themselves to commercial production because of the low yields obtained and because they have all been relatively expensive and time-consuming. Among such methods has been that of oxidation of hydrogen cyanide using various oxidizing agents. Where strong oxidizing agents are used such as manganese dioxide, potassium permanganate, chlorine, and the like, undesirable by-products are formed. In the oxidation of hydrogen cyanide with potassium permanganate, for example, the permanganate is reduced and the resulting manganous ions formed in the reaction solution must be removed if the process is to be continuous. This necessitates time-consuming and expensive process steps. With other similar oxidizing agents, the removal of by-products, in addition to being time-consuming, is very difficult to accomplish. More recently, a method to avoid some of these disadvantages has been proposed wherein cyanogen is prepared by reacting hydrocyanic acid with a cupric ion-releasing agent in aqueous medium. While this process is an adequate one, it is not wholly suitable in that it involves on a continuous basis the handling of large quantities of liquid slurries, filtration steps, drying operations, etc., all of which require extensive equipment representing considerable expenditures both in capital outlay and operating expense.

It has now been discovered that these disadvantages of the prior art may be overcome and cyanogen may be simply and readily produced in a straightforward single-step operation. According to the invention, cyanogen is prepared by passing hydrogen cyanide over copper oxide in a suitable reactor maintained at a temperature in the range from about 125° C. to about 175° C.

The invention is illustrated in the following examples which, however, are not to be construed as limiting it in any manner whatsoever.

Example I

A Pyrex tube about 20 in. long and 1 in. in diameter was employed as a reactor. It was fitted with a coarse fritted glass plate of the same cross-sectional area as the tube located about 12 in. from the top. The reactor was heated by means of resistance wire wrapping covered by the necessary insulation. Temperature in the reactor was measured by means of a mercury thermometer inserted through the top. The reactor outlet was adapted for connection to a condensate trap cooled by means of an ice bath and a gas sampling bomb or off-gas scrubber to facilitate collection of the reaction products.

A bed of powdered cupric oxide about 4 in. in depth was supported on the circular fritted glass plate within the reactor. The cupric oxide was heated to a temperature of approximately 150° C. It was thoroughly purged with nitrogen at this temperature and then hydrogen cyanide fed through a flowmeter at a rate of 0.2 gram-mole per hr. was passed through it for a period of about 20 min. while it was maintained at a temperature within the range from 150° C. to 160° C. The effluent gas passed directly from the outlet of the reactor into a gas sampling bomb which had previously been evacuated and the gas sample was then subjected to mass spectrometric analysis. On an air and water-free basis, the reaction effluent was found to contain 11.7 mole percent cyanogen representing a yield of about 68%.

Example II

The experiment of Example I was repeated at a temperature of 125° C. with the exception that the effluent gas was first passed through a condensate trap and then bubbled through a scrubber containing a 20% solution of sodium hydroxide. The resulting caustic solution was tested for the cyanate ion. The test was positive indicating that cyanogen was present in the effluent gas from the reactor as a reaction product.

Example III

The experiment of Example I was again repeated at a temperature of 150° C. to 160° C. using copper oxide which had been regenerated by heating the oxide previously used in a stream of air at a temperature of about 300° C. for about 30 minutes and allowing it to stand in the open overnight. The effluent gas after passing through the condensate trap was collected in a sampling bomb. An infrared analysis of the gas sample established that it contained cyanogen.

It will be obvious to one skilled in the art that various modifications may be made in the process exemplified without departing from the scope of the invention. For example, while the copper oxide is shown as disposed in a fixed bed, contact between the gaseous hydrogen cyanide and solid cupric oxide may be effected by so-called fluidization techniques.

The space velocity used in the illustrative examples was about 2 standard liters of hydrogen cyanide gas per liter of copper oxide per minute corresponding to a contact time of about 10 seconds. These values, however, are not critical. Optimum space velocity will vary with the temperature and the particle size of the copper oxide. Generally, space velocities of from about 0.1 min.$^{-1}$ to about 40 min.$^{-1}$ are satisfactory with those in the range from about 0.2 min.$^{-1}$ to 20 min.$^{-1}$ being preferred. Relatively short contact times are employed, those in the range from about 0.5 second to about 200 seconds being generally satisfactory and those from about 1 to about 100 seconds being preferred.

The temperature range throughout which the reaction may be conducted is somewhat critical. Any temperature from about 125° C. to about 175° C. may be employed. Little or no cyanogen is produced at temperature much outside this arnge.

The reaction is generally conducted at atmospheric pressure but there is no reason why superatmospheric pressures or subatmospheric pressures could not be used if desired.

The cyanogen formed may be separated from unreacted hydrogen cyanide in any convenient manner such as, for example, by fractional condensation. The hydrogen cyanide may be first condensed from the effluent gases at around 25° C. to 26° C., and cyanogen then separated out from the remaining gases by cooling these to about −20.5° C., the boiling point of cyanogen. A conventional series of low-temperature fractionating columns can be employed for this separation.

The used cupric oxide may be easily and readily regenerated for further use as an oxidizing agent by well known means, for example, by heating it in a stream of oxygen or air at temperatures above 300° C. The regenerated oxide has an efficiency in the reaction essentially equivalent to that of the fresh cupric oxide.

In addition to the use of cupric oxide alone, cupric oxide deposited on or supported on a carrier may also be used. The carrier may be any inert adsorbent material such as alumina, pumice, kieselguhr, kaolin, charcoal, and the like. The supported oxide may be readily prepared according to methods well known in the art, for example, by impregnating the carrier material with a solution of an oxidizable salt of copper and then firing the impregnated material in air to convert the salt to the oxide.

What is claimed is:

1. The method for the preparation of cyanogen which comprises contacting hydrogen cyanide with cupric oxide at a temperature within the range from about 125° C. to about 175° C.

2. The method for the preparation of cyanogen which comprises passing hydrogen cyanide over cupric oxide maintained at a temperature of 150° C. to 160° C. in a suitable reactor and recovering cyanogen from the resultant gases.

References Cited in the file of this patent
UNITED STATES PATENTS 2,841,472   Fierce et al. _____ July 1, 1958